US012654989B2

(12) United States Patent
Liebetrau

(10) Patent No.: US 12,654,989 B2
(45) Date of Patent: Jun. 16, 2026

(54) METHOD AND DEVICE FOR MONITORING PROPERTIES OF A SUPPORTING-MEANS ARRANGEMENT IN AN ELEVATOR SYSTEM

(71) Applicant: Inventio AG, Hergiswil (CH)

(72) Inventor: Christoph Liebetrau, Menziken (CH)

(73) Assignee: INVENTIO AG, Hergiswil (CH)

( * ) Notice: Subject to any disclaimer, the term of this patent is extended or adjusted under 35 U.S.C. 154(b) by 1605 days.

(21) Appl. No.: 15/733,515

(22) PCT Filed: Mar. 27, 2019

(86) PCT No.: PCT/EP2019/057694
§ 371 (c)(1),
(2) Date: Aug. 18, 2020

(87) PCT Pub. No.: WO2019/185695
PCT Pub. Date: Oct. 3, 2019

(65) Prior Publication Data

US 2021/0371245 A1 Dec. 2, 2021

(30) Foreign Application Priority Data

Mar. 27, 2018 (EP) ..................................... 18164231

(51) Int. Cl.
*B66B 7/12* (2006.01)
*B66B 1/34* (2006.01)
*B66B 5/02* (2006.01)

(52) U.S. Cl.
CPC .......... *B66B 7/1215* (2013.01); *B66B 1/3461* (2013.01); *B66B 5/02* (2013.01); *B66B 7/1207* (2013.01); *B66B 7/1246* (2013.01)

(58) Field of Classification Search
CPC ....... B66B 7/1215; B66B 1/3461; B66B 5/02; B66B 7/1207; B66B 7/1246
See application file for complete search history.

(56) References Cited

U.S. PATENT DOCUMENTS 6,123,176 A * 9/2000 O'Donnell ............ B66B 7/1215 187/393
2019/0119071 A1* 4/2019 Dudde .................... B66B 7/085
2021/0323790 A1* 10/2021 Robibero ............. G01R 31/081

FOREIGN PATENT DOCUMENTS

CN 1162564 A 10/1997
CN 1612840 A 5/2005

(Continued)

*Primary Examiner* — Jeffrey Donels

(74) *Attorney, Agent, or Firm* — Shumaker, Loop & Kendrick, LLP

(57) ABSTRACT

A method and a supporting-means monitoring device monitor properties of a supporting arrangement in an elevator system. The supporting arrangement has a plurality of supporting devices that support and can displace an elevator car. The method includes: measuring tensile forces acting on the supporting devices; and deriving change information indicating changes in the properties of the supporting arrangement by analyzing the progression over time of the measured tensile forces. By such an analysis, taking into consideration, for example, a temporal gradient, a frequency spectrum, and/or an amplitude of the progression over time of the measured tensile forces, there is derived e.g. information about wear on a surface profiling or a traction surface of a deflection roller or a traction sheave, information about wear on guide rails and/or information about wear of lateral guide structures on a roller for guiding one of the supporting devices.

13 Claims, 1 Drawing Sheet

(56) References Cited

FOREIGN PATENT DOCUMENTS

| | | | | | |
|---|---|---|---|---|---|
| CN | 100453441 | C | | 1/2009 | |
| CN | 104692205 | A | | 6/2015 | |
| CN | 205419374 | U | | 8/2016 | |
| CN | 106698148 | A | | 5/2017 | |
| EP | 1731470 | A1 | * | 12/2006 | ............... B66B 5/18 |
| WO | WO-2005097651 | A2 | * | 10/2005 | ............. B66B 15/02 |
| WO | 2012087312 | A1 | | 6/2012 | |

* cited by examiner

METHOD AND DEVICE FOR MONITORING PROPERTIES OF A SUPPORTING-MEANS ARRANGEMENT IN AN ELEVATOR SYSTEM

FIELD

The present invention relates to a method for monitoring properties of a supporting-means arrangement in an elevator system and to a supporting-means monitoring device configured to carry out such a method. The invention further relates to a computer program product and a computer-readable medium storing it.

BACKGROUND

In an elevator system, an elevator car is supported against gravity using a supporting-means arrangement and is displaced along an elevator shaft. In most cases, the supporting-means arrangement also supports and displaces a counterweight. The supporting-means arrangement typically comprises a plurality of elongated supporting means. The supporting means can withstand high tensile loads and can be bent transversely to their longitudinal direction. The supporting means can be, for example, suspension belts or suspension cables. The supporting-means arrangement can also include further elevator components by means of which, for example, the supporting means are fastened within the elevator shaft, the supporting means and thus the elevator car attached to them are displaced and/or the supporting means are deflected during such a displacement. For example, such further elevator components can comprise hitching devices by means of which one of the supporting means can be attached to a fastening structure in the elevator shaft or to an elevator car to be moved or a counterweight. The other elevator components can also be roller-like components such as drive pulleys, deflection rollers, guide rollers, etc.

Properties of the supporting means and the supporting-means arrangement formed from it are designed for use in the elevator system in such a way that safe and reliable operation of the elevator system is always guaranteed under normal operating conditions. For example, a number of supporting means in the supporting-means arrangement and a configuration of the individual supporting means are generally designed in such a way that the supporting-means arrangement can withstand all loads that occur under normal operating conditions without any problems.

In order for physical properties of the supporting-means arrangement, as originally designed, to be implemented in actual use, it must be ensured that the supporting-means arrangement is installed and operated in accordance with the concept. For example, the supporting-means arrangement should be installed in such a way that all supporting means are mechanically loaded in accordance with their specifications and in general, if possible, all to the same extent. Furthermore, the supporting-means arrangement should be operated in such a way that situations in which individual supporting means or other components of the supporting-means arrangement are overloaded or subjected to excessive wear are avoided as far as possible. In addition, operating conditions that can cause unpleasant or even dangerous situations for passengers in the elevator system should also be avoided as far as possible.

It should be monitored, especially, that the properties of the supporting-means arrangement do not change excessively negatively in comparison to the conceptual or initial properties and, in the worst case, the safety of the elevator system is endangered.

Traditionally, properties of the supporting-means arrangement of an elevator system were mostly monitored as part of an inspection by a technician. The technician had to check various components of the supporting-means arrangement manually, visually and/or using tools or equipment to be carried. This required a lot of effort, especially since many inspections turned out to be superfluous in retrospect. In addition, inspections carried out by people do not always reliably detect negative changes in the properties of the supporting-means arrangement.

In U.S. Pat. No. 6,123,176 a device for monitoring a cable tension in an elevator system and a corresponding method are presented. Mechanical stresses acting on a plurality of cables are measured by means of tension sensors and relative levels of tension within the plurality of cables are compared. However, only certain changes in the properties of the supporting-means arrangement can be detected here.

There may be a need, inter alia, for an improved method for monitoring properties of a supporting-means arrangement in an elevator system, and for a supporting-means monitoring device configured for carrying out such a method, and for a correspondingly designed computer program product and a computer-readable medium provided therewith. There may especially be a need to be able to monitor properties of a supporting-means arrangement automatically, reliably and/or with regard to a large number of different, potentially disadvantageous changes in the supporting-means arrangement.

SUMMARY

Such a need can be met via the subject matter and advantageous embodiments defined in the following description.

According to a first aspect of the invention, a method for monitoring properties of a supporting-means arrangement in an elevator system is proposed. The supporting-means arrangement here has a plurality of supporting means, by means of which an elevator car is supported and can be displaced. The method comprises measuring tensile forces acting on the supporting means and subsequently deriving change information indicating changes in the properties of the supporting-means arrangement by analyzing the progression over time of the measured tensile forces.

According to a second aspect of the invention, a supporting-means monitoring device is proposed for monitoring properties of a supporting-means arrangement in an elevator system. The supporting-means arrangement in turn comprises a plurality of supporting means by means of which an elevator car is supported and can be displaced. The supporting-means monitoring device is configured to execute or control a method according to an embodiment of the first aspect of the invention.

According to a third aspect of the invention, a computer program product is proposed that includes computer-readable instructions which instruct a computer to execute or control a method according to an embodiment of the first aspect of the invention.

According to a fourth aspect of the invention, a computer-readable medium having a computer program product stored thereon according to an embodiment of the third aspect of the invention is proposed.

Possible features and advantages of embodiments of the invention may be considered, inter alia, and without limiting the invention, as being based on the ideas and findings described below.

As already mentioned in the introduction, properties of a supporting-means arrangement of an elevator system should be monitored regularly in order to be able to promptly detect critical changes in these properties and, if necessary, to be able to initiate countermeasures, so that situations in which the safety of the elevator system could be endangered can be avoided.

The components of the supporting-means arrangement to be monitored may include, in addition to the plurality of supporting means themselves, components which interact with these supporting means. For example, the properties of rollers that deflect the supporting means should also be monitored. The term “rollers” is used generically here and is intended to include both actively driven rollers in the form of, for example, drive and traction sheaves, and passively idling rollers in the form of, for example, deflection rollers. Furthermore, the components to be monitored may also include hitching devices with which the supporting means can be fixed to supporting structures within the building accommodating the elevator. Furthermore, also those components of the elevator system which only interact indirectly with the supporting means or influence properties or a behavior thereof can be understood as components of the supporting-means arrangement which are to be monitored. Such components can include, for example, guide components, such as guide rails mounted in the elevator shaft, with the aid of which the elevator car is guided during its displacement and the current properties of which affect the guided car and thus the supporting means connected to the car and causing the displacement.

Alternatively or in addition to a regular manual or visual inspection of the supporting-means arrangement by a technician, an automated approach was proposed in U.S. Pat. No. 6,123,176, in which the mechanical stresses acting on elevator cables are measured using tension sensors and in which current conditions within the elevator system are deduced by comparing the relative levels of the tensions within the plurality of elevator cables. However, the proposed approach only allows certain changes in the supporting-means arrangement to be detected. For example, it can be detected when one of the elevator cables changes its length more strongly than other elevator cables over time, and thereby a load distribution changes within the plurality of elevator cables.

Embodiments of the present invention are based, inter alia, on the knowledge that by measuring tensile forces acting on the supporting means and then subsequently specifically analyzing these measured tensile forces, changes in the properties of the supporting-means arrangement can also be detected which are not reliably detectable using the aforementioned conventional approach. In the approach proposed here, especially, the progression over time of the measured tensile forces is to be analyzed. In other words, in contrast to the conventional approach, in which either largely static prevailing tensile forces were analyzed or instantaneously prevailing tensile forces were compared, how the tensile forces acting on the supporting means change over time is to be analyzed. If this is carried out in the case of a large number of elevator systems and the time courses measured over the elevator system limits are compared to other elevator systems, a large number of typical courses can be stored in a type of list based on this comparison. In comparison to the conventional inspection, which is restricted to a single elevator system, this enables a change of information indicating changes in the properties of the supporting-means arrangement to be derived much more precisely and reliably.

It was especially detected that the tensile forces acting on the supporting means vary over time in a manner characteristic of the respective change in the event of certain changes in the properties of the supporting-means arrangement, i.e., for example, in the case of certain defects or signs of wear. In other words, there can be a respectively assigned variation pattern for different types of changes in the properties of the supporting-means arrangement, the variation pattern indicating the way in which the respective change leads to temporal variations in the tensile forces acting on the supporting means. In the superordinate comparison of the elevator system, that is, in the comparison of a plurality of elevator systems, such variation patterns can be determined especially precisely. This applies all the more, the more data points are available, that is, the more elevator systems are compared or the longer the time course of the recording. A central evaluation device, that is, one which is external to and remote from the individual elevator system and is connected to a plurality of elevator systems, enables such a comparison.

By analyzing the progression over time of the measured tensile forces within the supporting-means arrangement, knowledge of the variation pattern can in many cases be used to deduce at least qualitatively, in some cases even quantitatively, the presence of typical changes in the properties of the supporting-means arrangement.

To implement embodiments of the present method, technical precautions may often be taken in elevator systems anyway in order to be able to measure the tensile forces acting on the supporting means. For example, one or more weight sensors are provided on the supporting-means arrangement in order to be able to draw conclusions about the weight of the elevator car via the tensile forces acting on the supporting means. This may be necessary in order to be able to avoid operating the elevator system when the elevator car is overloaded. The information about the current weight of the elevator car may also be used to be able to detect whether or not there are currently passengers in the elevator car. For example, it may be desirable to drive the elevator car only to a specific floor, for example to a top floor of a building having a penthouse apartment to be serviced exclusively by the elevator car if the elevator car is not occupied. The weight or force sensors on a supporting-means arrangement that are already provided for other purposes in the elevator system can be used to carry out the method proposed here in order to measure the tensile forces acting on the supporting means.

According to one embodiment of the invention, at least one of the following change information items can be derived from the analysis:

- information about wear on a surface profiling on a circumferential surface of a roller deflecting one of the supporting means and/or on a contact surface of one of the supporting means;
- information about wear on a traction surface on a circumferential surface of a traction sheave driving one of the supporting means and/or on a contact surface of one of the supporting means;
- information about wear on guide components that guide the elevator car during its displacement; and
- information about wear of guide structures which guide at least one of the supporting means, while it is deflected by a roller when the supporting means is displaced.

In other words, by analyzing the progression over time of the measured tensile forces on the supporting means, different types of information can be derived which, as change information, enable conclusions to be drawn about the current state of the supporting-means arrangement. The change information need not necessarily relate to the properties of the supporting means themselves, but can especially be directed to properties of elevator components which interact with these supporting means and/or indirectly influence their function.

For example, a surface profiling can be provided on a circumferential surface on a roller such as a traction sheave or a deflection roller. The surface profiling can bring about an improved traction between the roller and a supporting means running over this roller. Additionally or alternatively, the surface profiling can guide the supporting means running over it in a desired manner. The surface profiling can be formed, for example, by a multiplicity of V-shaped, U-shaped or otherwise contoured trenches or grooves on the circumferential surface of the roller, the trenches generally running parallel to the circumferential direction of the roller. The supporting means interacting with the roller can also have a profiled contact surface on its side facing the circumferential surface of the roller, the surface profiling of which can preferably interact in a complementary manner with the surface profiling of the roller, so that the desired traction and/or lateral guidance can be effected.

If wear occurs on the surface profiling of the roller and/or the supporting means over time, this can lead to a characteristic change in the behavior over time of tensile forces acting on the supporting means of the supporting-means arrangement, especially during the displacement of the supporting means for moving the elevator car.

For example, worn surface profiling can result in the surface profiling on the contact surface of the supporting means no longer permanently interacting in a desired manner with the surface profiling on the circumferential surface of the roller by their engaging within each other in a complementary manner, but instead the two surface profilings temporarily offset each other due to insufficient lateral guidance. In other words, the surface profiling of the supporting means, which is no longer sufficiently laterally guided, can be slightly laterally offset with respect to the surface profiling of the roller. Since this temporarily changes the effective radius of the roller, brief force peaks can be caused on the supporting means which is no longer correctly guided. Such force peaks can have characteristic properties on the basis of which the wear on the surface profilings can be detected. If necessary, an analysis of the time course of such force peaks can even be used to ascertain how the surface profiling has worn out, how much the wear has already progressed and/or whether the wear affects the surface profiling on the roller, on the supporting means or on both. Corresponding information can be included in the change information to be derived.

As a further possibility, information about wear on a traction surface of a traction sheave driving the supporting means and/or a contact surface of a supporting means interacting with this traction sheave can be derived by the proposed method. The traction surface or the contact surface can be specifically configured, for example by forming a microscopic or macroscopic roughness or profiling, to bring about the highest possible traction, i.e. power transmission, between the driving traction sheave and the driven supporting means. The traction may decrease due to wear. This in turn can lead to characteristic changes in the progressions over time of the measured tensile forces during the displacement of the supporting means. For example, a supporting means can briefly slip or be jerked due to poor traction. This can be accompanied by characteristic force peaks acting on the supporting means.

Furthermore, information can be derived about wear and tear on guide components which guide the elevator car during its displacement. Such guide components can be, for example, guide rails which guide the elevator car in a horizontal direction while it is being moved vertically through the elevator shaft. Wear on such guide components can, for example, result in the elevator car no longer being able to move smoothly in the vertical direction, but rather, for example, being inhibited in its vertical movement by brief excessive rubbing against one of the guide components. This, in turn, can lead to characteristic force peaks on the supporting means displacing the elevator car. For example, wear on a guide component can lead to vibrations acting in the vertical direction on the elevator car and thus on the supporting-means arrangement.

As a further example, information can be derived about wear on guide structures on a supporting means and/or on a roller deflecting a supporting means. The guiding structures serve here for the supporting means to be guided appropriately relative to the roller while it is being displaced and thereby deflected by the roller. Wear of these guide structures can in turn lead to a characteristic change in the progression over time of measured tensile forces acting on the supporting means.

For example, guide structures in the form of beads on which the traction sheave has a locally enlarged diameter can be provided on a traction sheave near its axial edges. These guide structures can guide a supporting means in the circumferential direction of the traction sheave and, especially, prevent a supporting means from slipping off the traction sheave in the axial direction. If such a guiding structure wears out over time, it can happen that the supporting means, which is no longer sufficiently laterally guided, briefly runs onto the bead forming the guiding structure, and a temporary force peak is brought about on the supporting means. A time course of such a force peak can in turn be characteristic of the type of wear mentioned.

In addition to the degree of wear, the information mentioned above is also influenced by the tolerance ranges of the components mentioned above. If the time courses of the tensile forces are compared across the elevator system, that is to say in an external and remote evaluation device, this comparison makes it possible to take into account the tolerance-related deviations. On the basis of the time course, categories can be formed in which the change is analyzed on a normalized basis for an initial tolerance. Deriving change information indicating changes in the properties of the supporting-means arrangement can take place even more reliably.

According to one embodiment of the method according to the invention, tensile forces acting on each of the supporting means are measured, and the change information is derived by analyzing the progression over time of the measured tensile forces on the individual supporting means.

For an embodiment of the supporting-means monitoring device according to the invention, this can mean that it has at least one sensor on a plurality of the supporting means for measuring tensile forces acting on the respective supporting means and also has an evaluation device for deriving information about changes in the properties of the supporting-means arrangement by analyzing the progression over time of the measured tensile forces.

In other words, not just a single force measuring sensor can be provided for the supporting-means arrangement comprising a plurality of supporting means, as could conventionally be sufficient, for example, for measuring the weight of the elevator car. Instead, it should be possible to individually measure the tensile force currently acting on this supporting means for each, or at least many, of the supporting means. For this purpose, an individually assigned force measuring sensor can be provided for all or at least some of the supporting means by means of which the tensile force currently acting on this supporting means can be determined. In this case, the tensile forces acting on the various supporting means at a common instant can be measured and then analyzed in order to be able to derive the desired change information with regard to the properties in the supporting-means arrangement.

According to a specific embodiment, the progression over time of the measured tensile forces on various of the supporting means can be compared when the change information is derived.

In other words, the desired change information need not be derived by analyzing a single progression over time of the tensile forces measured, for example, by a single sensor. Instead, measurement results from different sensors are available and indicate the progression over time of tensile forces that act on different supporting means of the supporting-means arrangement. Through analysis, i.e. for example a comparison, of these different progressions over time of tensile forces, additional information can be derived which enables a conclusion to be drawn about the type and/or extent of changes in the properties of the supporting-means arrangement.

For example, force peaks that act on all supporting means of a supporting-means arrangement at the same time and thus are measured simultaneously by the various sensors can indicate that the car as a whole is moving and temporary accelerations are being caused, for example, due to locally occurring friction on guide components. However, if force peaks are only measured on one or a few of the supporting means of a supporting-means arrangement, this can indicate that the supporting means concerned are subject to excessive wear.

According to one embodiment of the invention, the change information can be derived by analyzing a gradient of the progression over time of the measured tensile forces, analyzing a frequency spectrum of the progression over time of the measured tensile forces and/or analyzing an amplitude of the progression over time of the measured tensile forces.

In other words, the measured tensile forces can be analyzed to see how quickly the tensile forces change over time, i.e. how steep a time-related gradient of the temporally varying tensile forces is. Rapidly changing tensile forces can indicate jerky movements of the supporting means that may be characteristic of certain changes in properties of the supporting-means arrangement. A way in which the gradient of the time-varying tensile forces changes over time can also be characteristic of certain changes occurring within the supporting-means arrangement.

Alternatively or additionally, the measured tensile forces can be analyzed to determine how their frequency spectrum behaves. Every change in tensile forces can be interpreted as a superposition of periodically occurring tensile forces, so that a time profile of the changing tensile forces can be represented in the form of a frequency spectrum. For example, the changing tensile forces can be analyzed using a Fourier transformation. A way in which the measured tensile forces change over time, and thus the associated frequency spectrum, may, as mentioned, be characteristic of a specific change in properties of the supporting-means arrangement, so that various changes in such properties can be detected qualitatively and/or quantitatively on the basis of their characteristic frequency spectra and thus can be differentiated.

As a further alternative or in addition, the extent, that is to say the amplitude, of the tensile forces that change over time can allow conclusions to be drawn about the change in properties of the supporting-means arrangement that is causing this.

According to one embodiment of the invention, measurement values obtained by measuring the tensile forces can be transmitted to an external evaluation device which is remote from the elevator system and the information can be derived in the evaluation device.

In other words, in one embodiment of the supporting-means monitoring device, the evaluation device can be arranged external to and remote from the elevator system. In the preceding and the following, external and remote means outside the elevator system, especially outside the building in which the elevator system is located. An external and remote evaluation device can be used for two or more elevator systems, that is to say as a centralized evaluation device. This makes it possible not only to save on evaluation devices, but also enables the data from a plurality of elevator systems to be available at a central location. This in turn makes it possible to derive change information indicating changes in the properties of the supporting-means arrangement by analyzing the progression over time of the measured tensile forces based on comparisons across systems. This enables the reliability regarding the derivation of change information to be increased. The greater the number of elevator systems and the longer the stored time courses of the tensile forces of these elevator systems, the better the external and remote evaluation device can derive information. An external and remote evaluation device thus makes it possible to obtain better information regarding the condition of the supporting means from the comparison of a large number of time courses of tensile forces in supporting means from different elevator systems.

In other words, the analysis of the tensile forces acting on the supporting means, as were measured, for example, by sensors integrated in the elevator system, does not necessarily have to be carried out by means of a device contained in the elevator system, such as an elevator control or a locally provided evaluation device. Although this is possible in principle, it can entail additional expense for the hardware to be provided and/or the associated installation or maintenance work.

Instead, it can be provided to transmit the measured tensile forces to an externally and remotely arranged evaluation device outside the elevator system and have them analyzed there in order to ultimately derive the change information. The external evaluation device can be provided, for example, in a remote monitoring center by means of which, for example, many different elevator systems can be monitored. Alternatively, the external evaluation device can be designed using computers that are part of a data "cloud". The evaluation device can, for example, be connected to data-providing components of the elevator system via a network of the so-called "Internet of Things" (IoT—Internet of Things). Data or signals which represent the tensile forces measured by measuring sensors can be transmitted between the elevator system containing the measuring sensors and the external evaluation device via data transmission devices, for example by wire or wirelessly. The evaluation of the data in the data cloud makes it possible, based on data from a large number of measurements from a large number of elevator systems, to reliably derive change information indicating changes in the properties of the supporting-means arrangement. In this way, the list of known changes, such as those that occur in supporting-means arrangements, which have been created through tests carried out beforehand or on the basis of previous experience, and for these characteristic changes in time, can be continuously refined in the tensile forces acting on the supporting means. Furthermore, there is no need to subsequently update this list of known changes in a large number of individual evaluation devices integrated in the elevator system. The derivation of change information is thus improved and simplified by the external and remote evaluation device.

According to one embodiment of the invention, a notification signal can be output in the event that the derived change information indicates changes in the properties of a supporting-means arrangement according to which an inspection of the elevator system is required.

In other words, on the condition that from the previously derived change information it can be detected that changes have taken place in the supporting-means arrangement which make an inspection of the elevator system appear necessary, a corresponding notification signal can be output. The notification signal can be transmitted to a maintenance technician, for example. In this way, the maintenance technician can be informed as to when an inspection of the elevator system appears to be necessary. On the one hand, the maintenance technician can inspect the elevator system in good time before, for example, serious damage occurs or its safe operation is jeopardized. On the other hand, unnecessary inspections can be avoided.

Whether conditions exist that make an inspection of the elevator system appear necessary can be decided according to the situation after analyzing the progression over time of the measured tensile forces, that is to say after detecting the type and/or extent of changes in the properties of the supporting-means arrangement.

For example, a list of known changes, such as those that occur in supporting-means arrangements and for these apparently characteristic changes over time in the tensile forces acting on the supporting means, can be created through tests to be carried out beforehand or on the basis of previous experience. For each of the possible changes, you can then specify how critical it is to be regarded. It can be specified for certain changes that they make an inspection of the elevator system appear necessary. For other changes, it can even be stated that the operation of the elevator system should be modified or even completely adjusted when they occur.

According to a specific embodiment of the invention, the notification signal can contain information relating to the derived change information about changes in the properties of a supporting-means arrangement.

In other words, a technician can not only be informed with the notification signal that an inspection appears necessary, but the technician can also be given additional information as to how the properties of the supporting-means arrangement have changed in such a way that it should be inspected. On the basis of this additionally transmitted information, the technician can, for example, better plan his inspection, possibly get spare parts in advance and/or estimate the effort to be expected for the inspection. Such information can be effortlessly refined continuously in an external and remote evaluation device based on the large amount of data from different elevator systems.

According to one embodiment of the supporting-means monitoring device according to the invention, the sensors by means of which the tensile forces acting on the supporting means are to be measured can each be integrated into a hitching device, the hitching device being configured to attach at least one of the supporting means to a fastening structure.

In other words, the force measuring sensors can be integrated directly into a hitching device in a space-saving and/or cost-saving manner. The hitching device can be structurally configured to fix one or more supporting means to the fastening structure to which the supporting means are to be attached. The fastening structure can be, for example, a supporting structure of a building that houses the elevator system. Alternatively, a fastening structure can be provided on the elevator car and/or the counterweight. The hitching device typically interacts with an end region of a supporting means in order to attach this end region to a load-bearing elevator shaft ceiling or to the elevator car and the counterweight, for example.

Embodiments of the method described herein can be implemented or controlled using a computer or a programmable controller or an evaluation device. According to the third aspect of the invention, a computer program product can be used to instruct the computer or the control or the evaluation device in a suitable manner. The computer program product can be formulated in any desired computer-readable language. The computer or the control or the evaluation device can have the necessary hardware, especially a processor for processing data relating to the measured tensile forces, a memory for storing such data and/or interfaces for entering or outputting such data.

The computer program product may be stored on any computer readable medium, for example a flash memory, a CD, a DVD, RAM, ROM. PROM, EPROM, etc. The computer program product can also be stored on one or more servers, from which it can be downloaded via a network, especially via the Internet. The server can be part of a data cloud.

It should be noted that some of the possible features and advantages of the invention are described with reference to different embodiments, especially in part with reference to a monitoring method according to the invention and in part with reference to a supporting-means monitoring device according to the invention. A person skilled in the art recognizes that the features can be combined, transferred, adjusted, or replaced in a suitable manner in order to arrive at further embodiments of the invention.

Embodiments of the invention will be described below with reference to the accompanying drawings, with neither the drawings nor the description being intended to be interpreted as limiting the invention.

Figure 1:
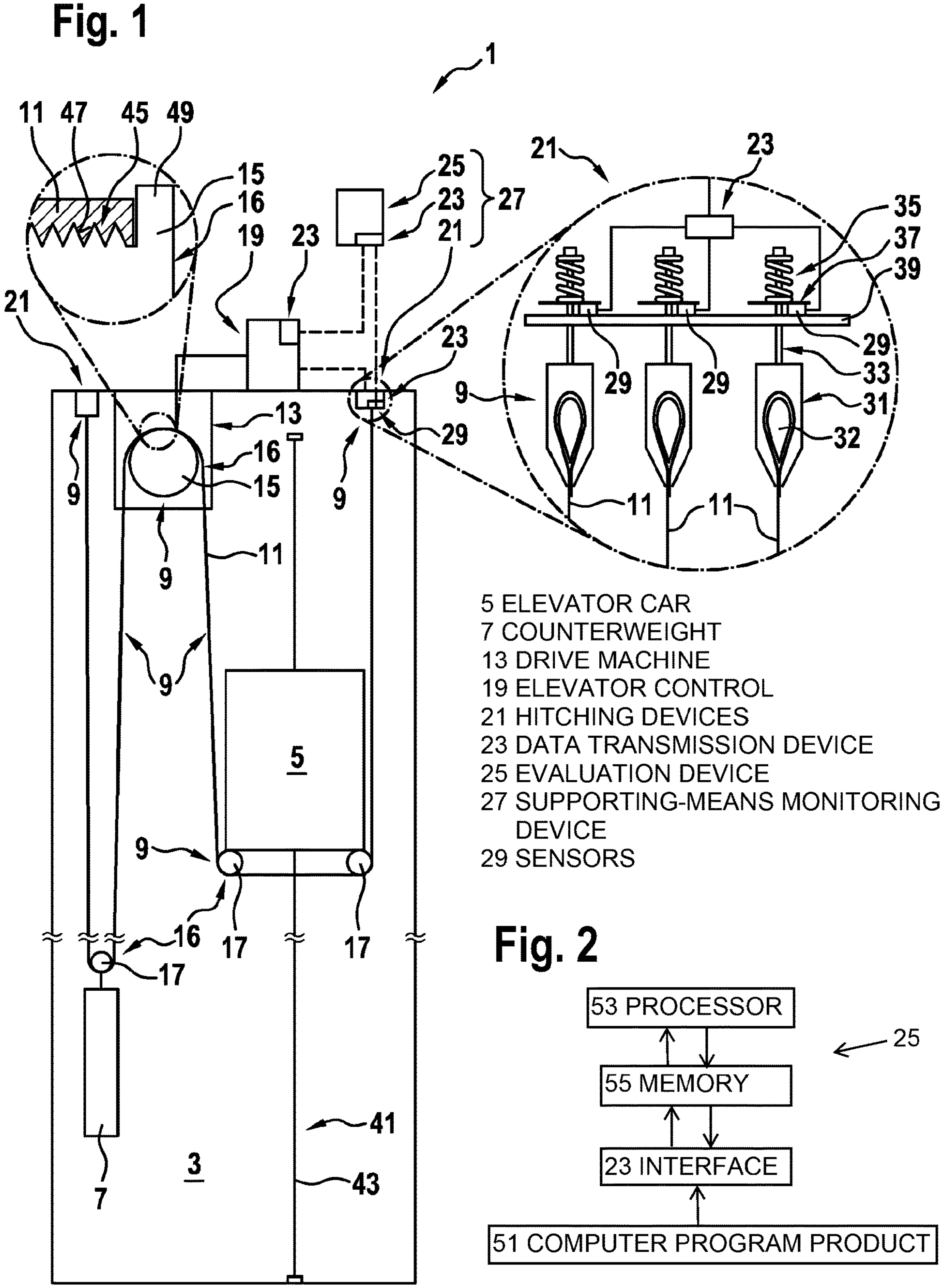
FIG. 1 shows an elevator system having a supporting-means monitoring device for carrying out a method according to an embodiment of the present invention.

The figure is merely schematic and is not to scale. The same reference signs indicate the same or equivalent features.

FIG. 2 is a block diagram of the evaluation device shown in FIG. 1 for implementing or controlling the method according to the present invention.

DETAILED DESCRIPTION

FIG. 1 shows an elevator system 1 in which an elevator car 5 and a counterweight 7 can be displaced vertically within an elevator shaft 3 using a supporting-means arrangement 9. The supporting-means arrangement 9 has a plurality of supporting means or devices 11 in the form of cables or belts. In the 2:1-type configuration shown, the supporting means 11 are attached with their ends to a ceiling of the elevator shaft 3 via hitching devices 21. Alternatively, in a 1:1-type configuration, the supporting means 11 could also be attached with their ends to the elevator car 5 or the counterweight 7 via a hitching device. The supporting means 11 can be driven via a traction sheave 15 driven by a drive machine 13 and, if necessary, can be deflected via deflection rollers 17, which can be attached to the elevator car 5 and/or to the counterweight 7, among other things. The traction sheave 15 and the deflection rollers 17 can be referred to generically as rollers 16 below. What they have in common is that they interact with one or more of the supporting means 11 of the supporting-means arrangement 9 and generally deflecting their course in the process. Operation of the drive machine 13 can be controlled by an elevator control 19.

The elevator system 1 shown contains a plurality of sensors 29 by means of which tensile forces acting on the supporting means 11 can be measured. Measurement results can be transmitted by wire or wirelessly to an evaluation device 25 by means of a data transmission device 23 and analyzed there with regard to the progression over time of the measured tensile forces in order to be able to derive desired change information from them. The evaluation device 25 can be part of the elevator system 1. Alternatively, the evaluation device can be provided external to and remote from the elevator system 1. Together with the evaluation device 25, the sensors 29 form a supporting-means monitoring device 27.

In FIG. 1, two areas having dashed lines are enlarged and depicted rotated 90° to show details of a supporting means 11 interacting with the traction sheave 15 on the one hand and details of a possible design of a hitching device 21 on the other hand.

In the example shown, the supporting means 11 is designed as a belt. The belt has V-shaped longitudinal grooves on a lower side, which form a surface profiling. The belt hugs a traction surface 47, which is formed by a circumferential surface of the traction sheave 15. The traction surface 47 is also designed with a surface profiling 45 which is essentially complementary to that surface profiling of the belt. The traction sheave 15 has bead-like lateral guide structures 49 at opposite axial edges. The lateral guide structures 49 are formed by regions of the traction sheave 15 having an enlarged radius and steep side flank, so that the supporting means 11 is guided laterally by the two lateral guide structures 49 and is prevented from sliding axially from the traction sheave 15.

The hitching device 21 serves to attach a plurality of the supporting means 11 contained in a supporting-means arrangement 9 to a fastening structure 39, such as, for example, a ceiling of the elevator shaft 3 in the case shown. For this purpose, the individual supporting means 11 are each accommodated in a loop-like manner in a clamping device 31, in which they are supported in a force-locking manner by a clamping action of a wedge 32. Each of the clamping devices 31 is connected via a rod 33, which extends through a respective opening in the fastening structure 39, to an associated spring 35, via which the tensile force caused by the supporting means 11 is ultimately transmitted to a pressure plate 37. A sensor 29 is provided between each of the pressure plates 37 and the fastening structure 39 by means of which sensor the force exerted by the pressure plate 37 can be measured and, thus, the tensile force exerted by the associated supporting means 11 can be determined.

As an alternative to the configuration shown in the figure, many other possibilities are conceivable in which the tensile forces acting on the supporting means 11 can be measured using suitably designed and positioned sensors 29. For example, it is conceivable to integrate a force measuring sensor directly into the clamping device 31 provided with the wedge 32, as a result of which, among other things, a number of components could be reduced.

Using the evaluation device 25, the tensile forces measured by the sensors 29 can be analyzed with regard to their progression over time. In this way, change information can be derived which can contain information about wear on the surface profiling 45 or on the traction surface 47, for example.

For example, if the surface profiling 45 wears, the supporting means 11 may no longer be correctly guided with respect to the traction sheave 15, but may temporarily move slightly in the axial direction of the traction sheave 15 and the surface profiling of the supporting means 11 is laterally offset with respect to the surface profiling 45 of the traction sheave 15 and runs upwards on it. This can lead to the supporting means 11 apparently being briefly driven by a traction sheave 15 having a larger radius and thus being conveyed at a higher circumferential speed, so that forces on the supporting means 11 temporarily increase. As soon as the supporting means 11 slides back into its correctly guided position with its surface profiling, these forces are reduced again. The increase and subsequent decrease in the tensile forces on the supporting means 11 can be characteristic of the lateral displacement of the supporting means 11 relative to the traction sheave 15 with respect to a gradient, a frequency spectrum and/or an amplitude of the progression over time of the tensile forces, so that by appropriate analysis of these variables the type and/or the extent of wear of the surface profiling 45 can be deduced.

In a similar manner, wear on the traction surface 47 can be deduced, provided that such wear leads to a reduced frictional force between the traction surface 47 of the traction sheave 15 and the contact surface of the supporting means 11 lying against it, and this reduced frictional force, for example, results in a brief, jerky slipping of the supporting means 11 relative to the traction surface 47. Here, too, analyzed gradients, frequency spectra and/or amplitudes can provide an indication of the type and/or extent of wear of the traction surface 47.

By suitably analyzing the measured tensile forces on the supporting means 11, cases can also be detected in which, for example, the elevator car 5 is guided using guide components 41 in the form of guide rails 43 and guide shoes (not shown) sliding along them during their vertical movement along the elevator shaft 3 and wear has occurred on the guide components 41. For example, the guide components 41 can show wear in such a way that forces which are exerted on the elevator car 5 are no longer caused uniformly, but rather, for example, jerky forces are induced on the elevator car 5. These are passed on to the supporting means 11 supporting the elevator car 5 and can thus be measured using the sensors 29. An analysis of gradients, frequency spectra and/or amplitudes of the measured tensile forces can also be used in this case to determine the type and/or extent of changes in the properties of the supporting-means arrangement 9 caused by the wear of the guide components 41.

Furthermore, embodiments of the method described here can also be used to deduce wear on guide structures 49 which, for example, laterally guide the supporting means 11 on the traction sheave 15 and prevent it from slipping off. Wear on these guide structures 49 can result in the supporting means 11 being able to displace itself briefly in the axial direction of the traction sheave 15 and thereby partially run onto the guide structures 49. The resulting apparently increased radius of the traction sheave 15 causes a brief force peak on the supporting means 11 before it slides back to its correct position on the traction surface. A gradient, a frequency spectrum and/or an amplitude of this force peak can be characteristic of the wear on the guide structure 49.

If it is detected that determined change information indicates a change in properties of the supporting-means arrangement 9 which is so significant that it appears necessary to inspect the elevator system, the evaluation device 25 can output a notification signal. This notification signal can be transmitted, for example, to an external monitoring center or a technician performing the inspection. If necessary, information can be integrated into the notification signal, which includes information about the type and/or the extent of a detected change in the properties of the supporting-means arrangement 9, so that the inspection can be prepared and carried out in a targeted manner.

The method proposed here and the supporting-means monitoring device 27 provided for its implementation can enable a simplified installation of the supporting-means arrangement 9, a reduced effort in the maintenance of the supporting-means arrangement 9 and/or an increased reliability when monitoring properties of the supporting-means arrangement 9. The method can be implemented or controlled by the evaluation device 25 shown in more detail in FIG. 2. The device 25 also could be a computer or a programmable controller. A computer program product 51, formulated in any desired computer-readable language, can be used to instruct the device 25 in a suitable manner. The device 25 can have the necessary hardware, especially a processor 53 for executing the computer program and processing data relating to the measured tensile forces, a memory 55 for storing the computer program and such data and/or interfaces 23 for entering or outputting such data.

Finally, it should be noted that terms such as "having," "comprising," etc. do not preclude other elements or steps and terms such as "a" or "an" do not preclude a plurality. Furthermore, it should be noted that features or steps that have been described with reference to one of the above exemplary embodiments can also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for monitoring properties of a supporting-means arrangement in an elevator system, wherein the supporting-means arrangement has a plurality of supporting means by which an elevator car is supported and displaced, the method comprising the steps of:

measuring tensile forces acting on the supporting means during operating conditions of the elevator system;

deriving change information indicating changes in properties of the supporting-means arrangement by analyzing a progression over time of the measured tensile forces by analyzing at least one parameter selected from a group of parameters consisting of a gradient of the progression over time of the measured tensile forces, a frequency spectrum of the progression over time of the measured tensile forces, and an amplitude of the progression over time of the measured tensile forces; and determining whether an inspection of the elevator system appears necessary based upon the change information.

2. The method according to claim 1 wherein the change information includes at least one of the following change information items derived from the analysis:

information about wear on a surface profiling on at least one circumferential surface of a roller deflecting one of the supporting means and a contact surface of the one supporting means;

information about wear on a traction surface on at least one circumferential surface of a traction sheave driving one of the supporting means and a contact surface of the one supporting means;

information about wear on a guide component of the elevator car during a displacement of the elevator car along the guide component; and information about wear of lateral guide structures for guiding one of the supporting means while the one supporting means is deflected by a roller when the one supporting means is displaced.

3. The method according to claim 1 including measuring tensile forces acting on each of the individual supporting means and deriving the change information by analyzing the progression over time of the measured tensile forces on the individual supporting means.

4. The method according to claim 3 wherein when the change information is further derived by comparing the progressions over time of the measured tensile forces on the individual supporting means.

5. The method according to claim 1 including transmitting measured values obtained by measuring the tensile forces to an external evaluation device located remote from the elevator system and operating the evaluation device to derive the change information.

6. The method according to claim 1 including generating a notification signal when the derived change information indicates changes in the properties of the supporting-means arrangement that appear to require an inspection of the supporting-means arrangement.

7. The method according to claim 6 wherein the notification signal contains information related to the derived change information about the changes in the properties of the supporting-means arrangement.

8. A supporting-means monitoring device for monitoring properties of a supporting-means arrangement in an elevator system, wherein the supporting-means arrangement has a plurality of supporting means by which an elevator car is supported and can be displaced, comprising: the supporting-means monitoring device being adapted to execute or control the method according to claim 1 when connected to the elevator system.

9. The supporting-means monitoring device according to claim 8 comprising:

at least one sensor for measuring the tensile forces acting on respective ones of the supporting means;

an evaluation device receiving the measured tensile forces and deriving the change information indicating the changes in the properties of the supporting-means arrangement by analyzing the progression over time of the measured tensile forces.

10. The supporting-means monitoring device according to claim 9 wherein the evaluation device is arranged external to and remote from the elevator system.

11. The supporting-means monitoring device according to claim 9 including a plurality of sensors for measuring the tensile forces, each of the sensors being integrated in a hitching device for fastening one of the supporting means to a fastening structure in the elevator system.

12. A computer program product comprising non-transitory computer readable instructions that when loaded into a computer instruct the computer to execute or control the method according to claim 1.

13. A non-transitory computer-readable medium having the computer program product according to claim 12 stored thereon.

* * * * *